United States Patent [19]
Yeung et al.

[11] Patent Number: 5,654,529
[45] Date of Patent: Aug. 5, 1997

[54] STYLUS-INPUT COMPUTING SYSTEM WITH ERASURE

[75] Inventors: Chun Wun Yeung; Beng Hong Kang, both of Singapore, Singapore

[73] Assignee: Hewlett-Packard Company, Palo Alto, Calif.

[21] Appl. No.: 433,771

[22] Filed: May 3, 1995

[51] Int. Cl.$^6$ .............................. G08C 21/00; G09G 3/02
[52] U.S. Cl. ................................ 178/18; 178/19; 345/179
[58] Field of Search ................................ 178/18, 19, 20; 345/173, 179, 156

[56] References Cited

U.S. PATENT DOCUMENTS

| | | | |
|---|---|---|---|
| 4,646,107 | 2/1987 | Shimizu | 364/79.2 |
| 4,670,751 | 6/1987 | Enokido | 178/18 |
| 4,697,050 | 9/1987 | Farel et al. | 178/18 |
| 4,711,977 | 12/1987 | Miyamon | 178/18 |
| 5,134,388 | 7/1992 | Murakami | 345/173 |
| 5,231,578 | 7/1993 | Levin et al. | 364/419 |
| 5,401,916 | 3/1995 | Crooks | 178/18 |

FOREIGN PATENT DOCUMENTS

| | | |
|---|---|---|
| 0229637 | 7/1987 | European Pat. Off. . |
| 229637 | 7/1987 | European Pat. Off. . |
| 0618715 | 10/1994 | European Pat. Off. . |
| 618715 | 10/1994 | European Pat. Off. . |
| 622753 | 11/1994 | European Pat. Off. . |
| 0622753 | 11/1994 | European Pat. Off. . |

*Primary Examiner*—Curtis Kuntz
*Assistant Examiner*—Vijay Shankar

[57] ABSTRACT

A handheld computing device has a planar display and a superimposed, transparent digitizer. The combination is arranged to simulate writing or drawing with pencil on paper: the writing end of a passive stylus is pressed on and moved across the digitizer surface and a line on the display is produced directly under the stylus path. In order to complete the analogy to pencil and paper, display erasure is also provided. Under the display is located an inductive winding. The other end of the stylus contains a small permanent magnet. When the magnet end of the stylus is pressed against the digitizer and moved over a display line, a small voltage is induced in the inductive winding. This voltage is converted into a logic signal. The assertion of this signal together with a signal from the digitizer results in the erasure of display traces in the region inferred from the digitizer signal.

12 Claims, 4 Drawing Sheets

STYLUS-INPUT COMPUTING SYSTEM WITH ERASURE

FIELD OF THE INVENTION

This invention relates to the interaction between computers and users and, more particularly, to intuitive graphical interfaces which allow the user to write and erase using a hand-held stylus on an electronic display.

BACKGROUND OF THE INVENTION

Many graphical computer interfaces are being used in an effort to match more closely the established habits of humans when they communicate with writing. In the most natural and intuitive of these interfaces, a human user "writes" with a stylus on the surface of a computer-driven display, entering handwriting, sketching a diagram or picture, pressing a "button", etc. What actually happens, of course, is that the user stimulates a digitizer, co-located with the display, and the digitizer signals the position of the stylus to the computer. The computer then responds appropriately, driving the display to reproduce the path of the stylus (thus making an image of the handwriting or picture) or to signal that the button has been pressed. In this way, the stylus/digitizer/display combination becomes a close metaphor to the common pencil and paper tablet that nearly everyone uses.

However, to complete the metaphor, an erase function is needed to complement the write function. In the case of the pencil and tablet, an eraser is conveniently located opposite the writing end of the pencil, and the user merely has to invert the pencil to use it. Such simplicity should also characterize the electronic equivalent.

Several examples of providing an erase function are found in the art. In Levin et al (U.S. Pat. No. 5,231,578, issued Jul. 27, 1993), a stylus with writing and erasing ends is paired with a digitizer and the combination drives a display. However, the display is separate from the digitizer and thus some of the intuitive analogy to the pencil/tablet is missing. In addition, the stylus is an active device, tethered to the system with a cable carrying power and signals.

Farel et al (U.S. Pat. No. 4,697,050, issued Sep. 29, 1987) discloses a self-contained stylus with physical writing and erasing ends. This is used in conjunction with an actual drawing board. However, an electronic grid under the board picks up signals from the stylus as it is writing (or erasing) and sends these to a computer for recording or other use. The stylus is an active device powered with an internal battery.

Other examples exist in the art in which erasure takes place by manipulating a graphical erase icon around the display screen with a stylus. Likewise, there are examples in which the write and erase functions are carried out by separate handheld devices.

If both write and erase functions are allowed in intuitive interfaces, it appears that this leads, inevitably, to a stylus with active circuitry in order to distinguish the two functions.

It would considerably advance the art to have a simple, passive, and inexpensive stylus which can be used very much like a pencil for both writing and erasing.

SUMMARY OF THE INVENTION

In a preferred embodiment of the invention, a handheld computing device is provided with a planar electronic display, preferably a liquid-crystal screen. Directly above the screen is a transparent, planar digitizer which is stimulated by pressing on its surface. Both the display and the digitizer are part of a microprocessor-based system. The hardware and software of this system are arranged so that, in a common mode of operation, the display reproduces the path of a moving stylus pressing on the surface of the digitizer. This action simulates handwriting or drawing. Other modes of operation are also available, such as presenting the user with control "buttons" to press.

To improve the analogy between the handheld device and the use of pencil and paper, an erase function is also provided. The stylus has both a writing end and an erasing end, similiar to a pencil. When the user inverts the stylus and presses the digitizer with the erasing end, the system removes any graphical traces under the stylus in a manner closely resembling rubber erasure of pencil traces on paper, except that multiple passes are not needed for complete removal of the traces.

Under the display is located an inductive winding, preferably in the form of a planar spiral. The erasing end of the stylus contains a permanent magnet with a localized field. When this end approaches, retreats from, or moves across the digitizer, an AC voltage is induced in the winding. This AC signal is conditioned to provide an ERASE ENABLE signal to the microprocessor. When ERASE ENABLE is present AND there is a digitizer signal, the system erases any graphical trace in the neighborhood indicated by the digitizer. Thus a trace may be removed by moving the stylus across; the digitizer surface above the trace. Likewise a single point may be erased by moving the stylus toward, and then contacting, the digitizer.

No active devices are used, no power is consumed by the stylus, and the manufacturing cost is low.

DETAILED DESCRIPTION OF THE PREFERRED EMBODIMENT

Figure 1:
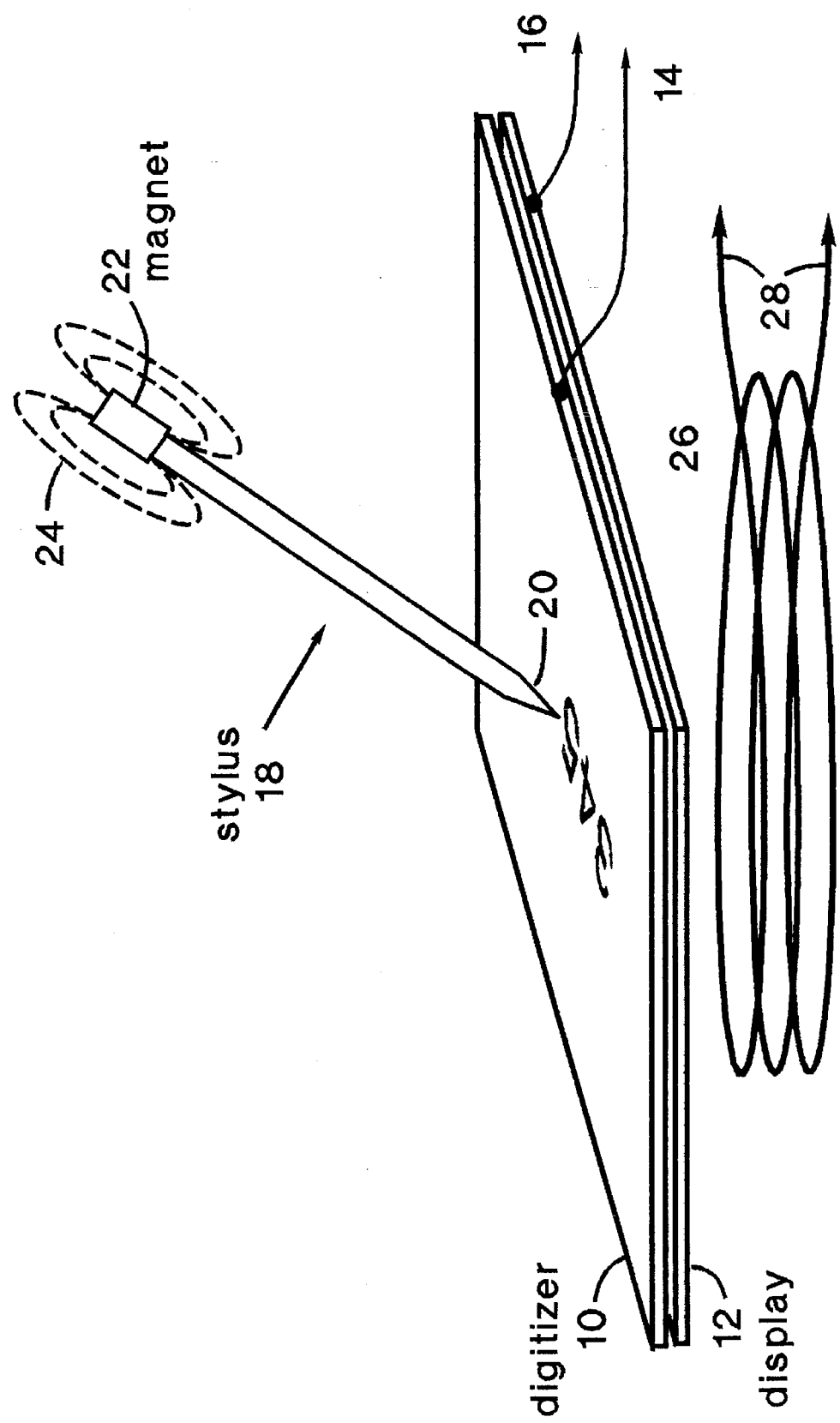
FIG. 1 is a layout diagram of the graphics elements of the system, together with the sensing inductive winding.

Referring now to FIG. 1, there are shown several elements of a handheld computer system designed to interact with the user in an intuitive manner closely resembling the use of pencil and paper. A planar graphical display 12 is overlaid with a transparent planar digitizer 10. In the preferred embodiment, display 12 is a liquid crystal type, although other varieties, such as electroluminescent, could be used if higher power consumption is tolerable. Digitizer 10 is composed of layers of both electrically conductive and insulating material. These are arranged so that, when the digitizer surface is pressed, resistances measurable on cable 14 can be interpreted to determine the surface position where the pressure was applied. Both digitizer 10 and display 12 have active areas nominally the same size, and these active areas are superimposed in the assembled computer. Cable 16 supplies drive signals to display 12, enabling the generation or removal of image elements ("pixels") anywhere on the active area of the display. Cable 16 connects to the system microprocessor, not shown in this figure, while cable 14 connects to a digitizer interface circuit, also not shown. Further details and illustrations of these devices will be set forth below.

The computer has a user-input device, stylus 18, for signalling the system via digitizer 10. This simple, passive device has a pointed writing end 20 and an erasing end 22. Secured to the erasing end is a permanent magnet, whose (invisible) magnetic field is symbolically represented by the dotted lines 24.

Directly under display 12 is an inductive winding 26. The size and location of this winding makes it responsive to a magnetic field applied anywhere in the active areas of digitizer 10 and display 12. In the figure, winding 26 is illustrated by the well-recognized circular solenoid symbol. In practice, it is likely to be a planar winding, as illustrated in other figures in the disclosure. Connections 28 from winding 26 are coupled to a signal conditioner later explained and illustrated.

Much of the operation of this type of computer system consists in the user moving the writing end 20 of stylus 18 in a path on the surface of digitizer 10, using enough pressure to activate the digitizer. Usually this is about the same pressure as that required to make a legible mark with a pencil on a piece of paper. If the computer writing mode is expecting a handwriting or drawing input, then the system generates a graphical trace on display 12 duplicating the stylus path and located directly under it. In another mode, graphical "buttons" indicate choices and the user is expected to press one with the stylus. These and other writing modes are known in the art and no further explanation is needed for clarity of this disclosure, which will, instead, now address novel features of the invention, especially erasure.

Figure 2:
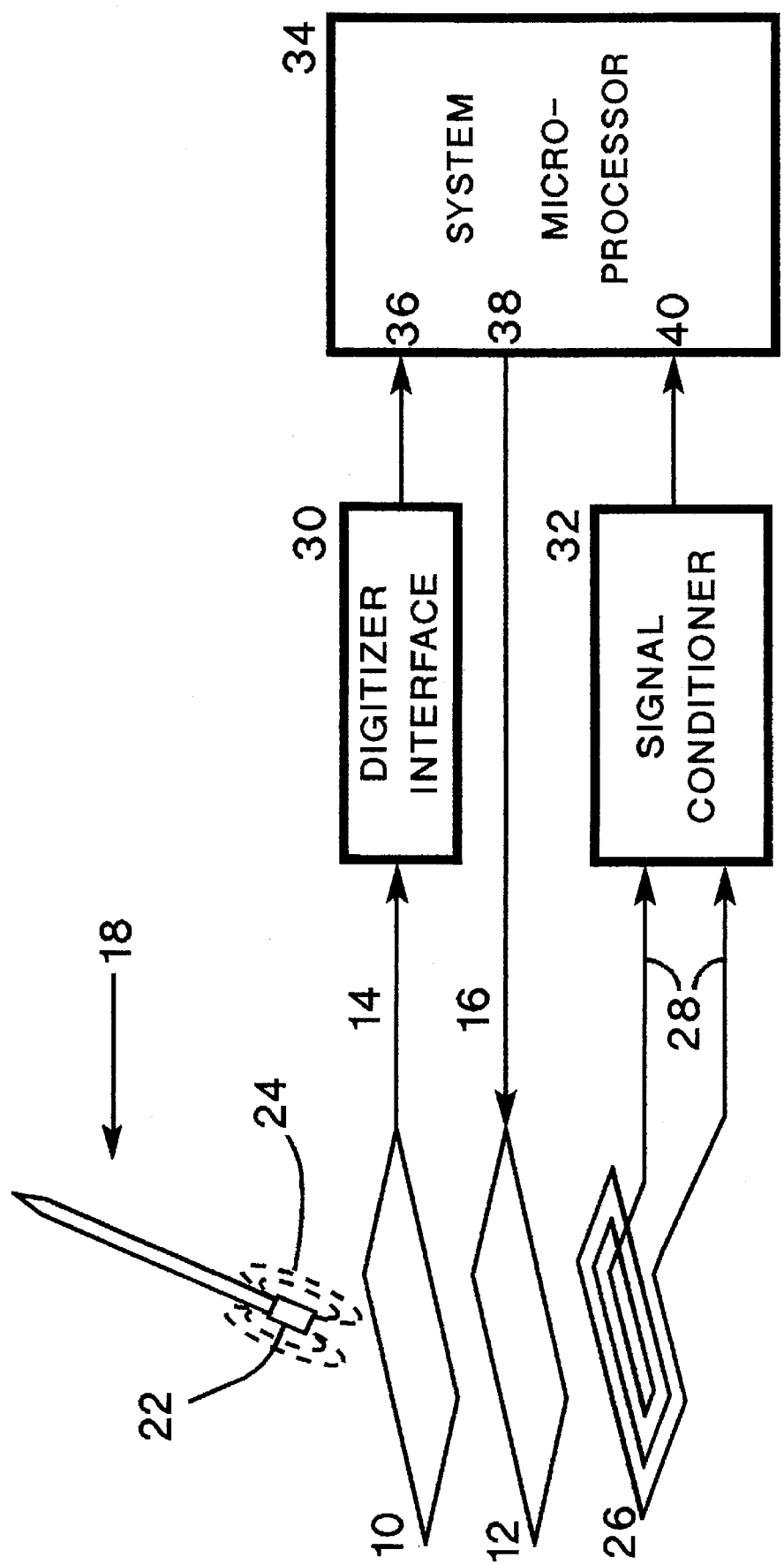
FIG. 2 is a block diagram of the preferred embodiment of the invention.
Figure 4:
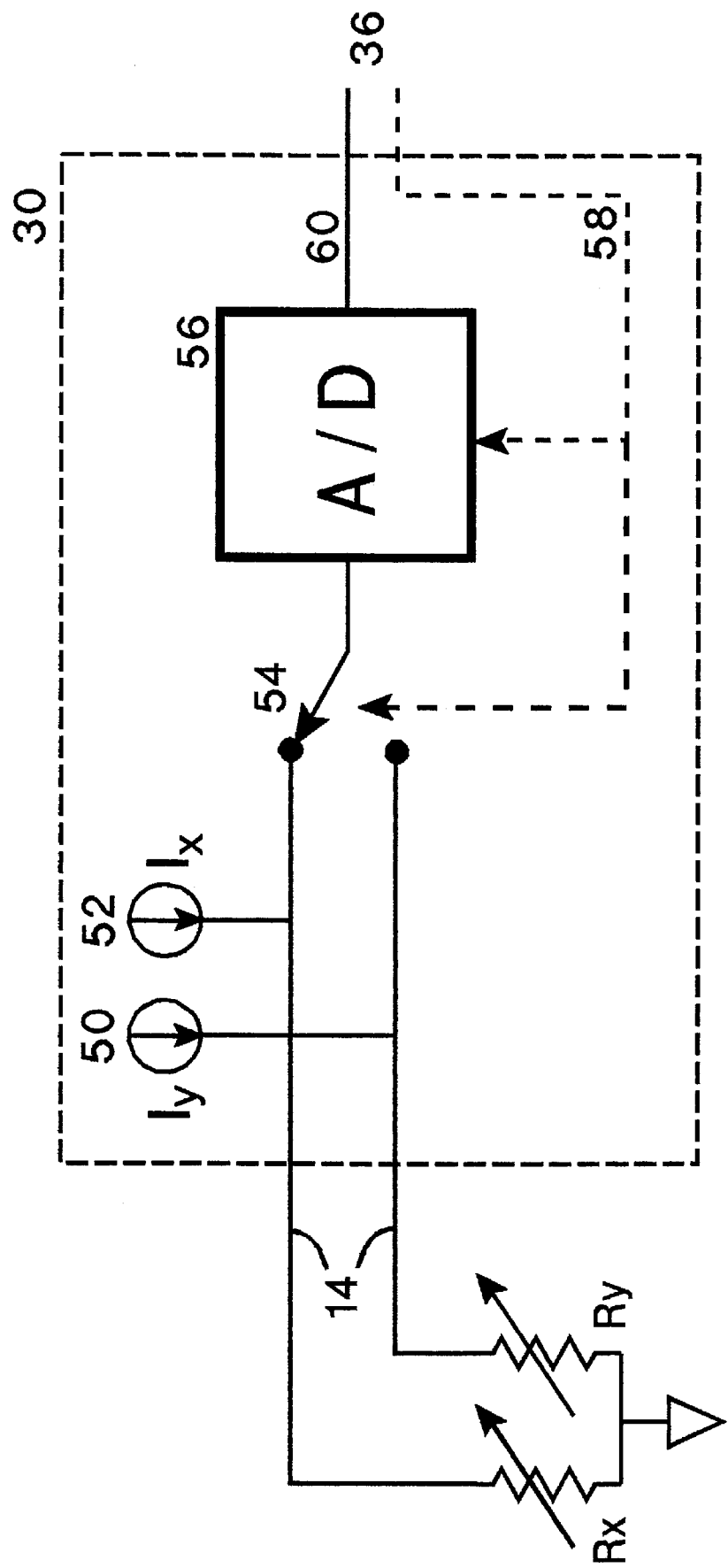
FIG. 4 is a diagram of a digitizer interface circuit.

FIG. 2 shows additional elements of the handheld computer. A digitizer interface circuit 30 is needed to convert the variable resistance values from the digitizer into data words readable by the system microprocessor 34. Interface 30 sends these words to the processor port 36. FIG. 4 shows circuitry for implementing interface 30, and its operation is explained below.

Processor 34 drives display 12 via port 38 and cable 16. Sometimes scanning circuits, external to the processor, are used to drive displays. However, for a handheld device, the display driving task can usually be done entirely by the processor, as is indicated here.

Moving the erasing end 22 of stylus 18 in the vicinity of the digitizer causes magnetic flux lines 24 to cut portions of inductive winding 26. This action induces a varying voltage in the winding, which appears on its connections 28. This AC voltage is of the order of millivolts, and must be conditioned to provide a logic signal ERASE ENABLE to port 40 of processor 34. Signal conditioner 32 performs this task. Its circuitry and operation are explained below and illustrated in FIG. 3.

To understand the erasure function of the invention, it is useful to summarize combinations of states of the digitizer 10 and the induced voltage in winding 26, and the actions implied by these combinations:

| COMBIN. NO. | DIGITIZER | INDUCED VOLTAGE | ACTION |
|---|---|---|---|
| 1 | off | zero | no action |
| 2 | off | non-zero | eraser is moving toward or away from digitizer |
| 3 | on, changing | zero | writing end moving on digitizer |
| 4 | on, no change | zero | writing or erasing end of stylus held stationary on digitizer |
| 5 | on, changing | non-zero | erasing end moving on digitizer |

From this list of states, it can be seen that erasing is defined by combination 5. That is, the processor should be programmed to remove graphical traces in the vicinity indicated by the digitizer during combination 5. The radius of erasure can, conveniently, be set by the user according to the complexity and fine structure of the graphic material.

For user convenience, an additional event may also invoke erasure: if combination 2 transitions to combination 4, this can indicate the user's desire to erase a single point or a chosen, circular area around such a point.

Figure 3:
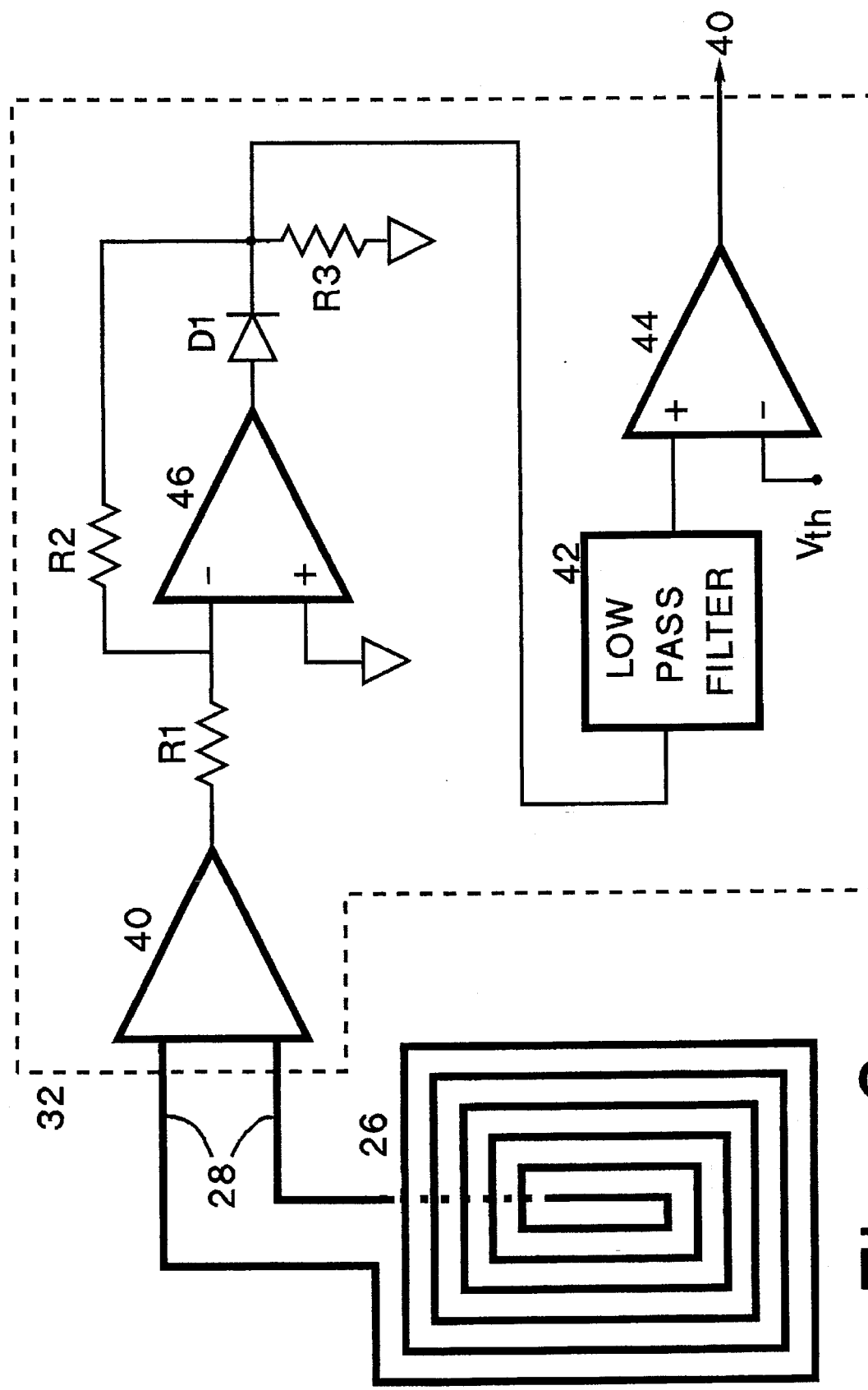
FIG. 3 is a diagram showing a preferred topology of the inductive winding plus circuit elements of a signal conditioner.

The operation of signal conditioner 32 may be appreciated by reference to FIG. 3 and the following comments. The function of signal conditioner 32 is to convert the small, magnetically induced signal in winding 26 into a (typically) TTL logic signal ERASE ENABLE to be supplied to processor port 40. In the figure, winding 26 is shown as a planar, rectangular, spiral inductance. Preferably, this inductance is created by etching its pattern on a printed circuit board. Its sensitivity to a small, varying magnetic field is nominally constant over its area, with local maxima in the neighborhood of each conductor.

The signal in winding 26 is supplied to a DC-coupled amplifier 40, which amplifies it to an average level of about 3 volts RMS. (For use inside buildings, amplifier 40 should have negligible response to powerline frequencies.) The output of amplifier 40 is then connected to a circuit comprising operational amplifier 46, R1, R2, R3, and D1. These elements are arranged as a full wave rectifier with positive output. Assigning the resistor values R1=10K, R2=5K, and R3=15K, for instance, will result in symmetrical rectification with a gain of 0.5 for both positive and negative portions of the AC signal. This rectified signal then passes through lowpass filter 42, whose cutoff frequency is about 10 Hz. The optimum frequency should be determined experimentally, as it depends on the size and pitch of winding 26, the strength of stylus magnetic field 24, and other factors difficult to quantify. Output from lowpass 42 is then supplied to a comparator 42, where it is compared against a reference threshold voltage Vth and translated to TTL logic levels. The optimum value of Vth should be determined experimentally. The output from comparator 42 is the ERASE ENABLE logic signal used to distinguish states 1, 3, and 4 from states 2 and 5 in the above table.

For an understanding of digitizer interface 30, reference is now made to FIG. 4, showing a simplified circuit of the interface. Digitizer 10 is represented electrically as two variable resistors Rx and Ry. When writing end 20 of stylus 18 presses on the surface of digitizer 10, the values of these resistors represent the X and Y coordinates, respectively, of the stylus position. These resistance values are converted into voltages by current sources Ix (52) and Iy (50). Multiplexing is used to conserve circuitry: these voltages are converted, in repetitive sequence, to digital words by A/D converter 56. The sequencing is handled by a control signal from processor 34, which arrives from port 36 on line 58. The control signal operates multiplexer 54 and enables conversion in A/D 56. A sequencing rate of at least 100 Hz is usually adequate to generate X and Y sample value trains characterizing the successive positions of stylus 18. A/D 56 supplies 8- or 10-bit words to processor 34 via line 60 and port 36.

An advantage of this circuit configuration is that it is simple to determine when digitizer 10 is ON (activated) or OFF. When there is no pressure on the digitizer surface, both Rx and Ry are open circuits, and the voltages on lines 14 rise to the limits of the compliance ranges of current sources 50 and 52. When this happens, A/D 56 will signal an overload condition, and this can be interpreted by the processor as "digitizer OFF".

We have described and illustrated the principles of our invention with reference to a preferred embodiment; however, it will be apparent that the invention can be modified in arrangement and detail without departing from such principles. For instance, the display need not be co-located with the digitizer; this reduces the intuitive analogy to pencil and paper but is clearly within the scope of the invention disclosed herein. Another variation is to locate a non-transparent digitizer under a flexible display. A further variation is using a non-planar, transparent digitizer and an inductive winding on the spherical surface of a cathode-ray display. Thus, it will be recognized that the detailed embodiment is illustrative only, and should not be taken as limiting the scope of our invention. Rather, we claim as our invention all such variations as may fall within the scope and spirit of the following claims and equivalents thereto.

We claim:

1. In a stylus-based electronic writing system, comprising a digitizer traversed by a writing stylus and an electronic display imaging the path of the writing stylus across the digitizer, a method for erasing a portion of the image, the method comprising the steps of:
   a) securing a permanent magnet to an erasing end of the writing stylus opposite a writing end;
   b) co-locating an inductive winding with the digitizer;
   c) contacting the digitizer with the erasing end of the writing stylus;
   d) monitoring the inductive winding for the presence of a signal induced therein by motion of the permanent magnet; and
   e) erasing a portion of the image indicated by the path of the erasing end across the digitizer when there is a signal simultaneously present in the inductive winding.

2. A method for erasing, as recited in claim 1, including after step (b) the further step of
   b1) co-locating the display with the inductive winding and the digitizer.

3. A stylus-based electronic writing system having both writing and erasing functions, comprising:
   a) a writing stylus having a writing end and an erasing end, and a permanent magnet secured to the erasing end;
   b) a digitizer having a writing surface and an output for signals indicating a location on the writing surface touched by the writing stylus;
   c) an electronic display having a drive input;
   d) a display driver having an input coupled to the digitizer output, an ERASE ENABLE input, and a drive output coupled to the electronic display drive input;
   e) an inductive winding similiar in size to, and proximate the digitizer;
   f) a conditioning circuit having an input coupled to the inductive winding and an output coupled to the ERASE ENABLE input.

4. A stylus-based electronic writing system, as recited in claim 3, wherein the writing stylus is a passive device.

5. A stylus-based electronic writing system, as recited in claim 3, wherein the display driver is incorporated within a microprocessor controlling the stylus-based electronic writing system.

6. A stylus-based electronic writing system, as recited in claim 3, wherein the digitizer comprises pressure-sensitive conductive sheets having X and Y output signals.

7. A stylus-based electronic writing system, as recited in claim 3, wherein the electronic display is a liquid-crystal type.

8. A stylus-based electronic writing system, as recited in claim 3, wherein the inductive winding is a planar spiral.

9. A stylus-based electronic writing system, as recited in claim 3, wherein the conditioning circuit further comprises a full-wave rectifier coupled to a logic level translator.

10. A stylus-based electronic writing system, as recited in claim 3, wherein the electronic display is similiar in size to, and co-located with, the digitizer.

11. A stylus-based electronic writing system having both writing and erasing functions, comprising:
    a) a writing stylus having a writing end and an erasing end, and a permanent magnet secured to the erasing end
    b) a transparent digitizer having a writing surface and an output for signals indicating a location on the writing surface touched by the writing stylus;
    c) an electronic display similiar in size to, and co-located with the transparent digitizer proximate a surface of the transparent digitizer opposite the writing surface, the electronic display having a drive input;
    d) a display driver having an input coupled to the transparent digitizer output, an ERASE ENABLE input, and a drive output coupled to the electronic display drive input;
    e) an inductive winding similiar in size to the transparent digitizer and display, and co-located therewith;
    f) a conditioning circuit having an input coupled to the inductive winding and an output coupled to the ERASE ENABLE input.

12. A stylus-based electronic writing system, as recited in claim 11, wherein the transparent digitizer, the electronic display, and the inductive winding are planar devices.

* * * * *